(12) United States Patent
Ding et al.

(10) Patent No.: US 11,091,840 B2
(45) Date of Patent: *Aug. 17, 2021

(54) CORROSION INHIBITING ADDITIVE

(71) Applicant: RAYTHEON TECHNOLOGIES CORPORATION, Farmington, CT (US)

(72) Inventors: Zhongfen (Vivian) Ding, South Windsor, CT (US); Georgios S. Zafiris, Glastonbury, CT (US); Weilong Zhang, Glastonbury, CT (US); Michael A. Kryzman, West Hartford, CT (US); Catalin G. Fotache, West Hartford, CT (US); Mark R. Jaworowski, Sarasota, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 377 days.

This patent is subject to a terminal disclaimer.

(21) Appl. No.: 16/036,168

(22) Filed: Jul. 16, 2018

(65) Prior Publication Data

US 2018/0320272 A1 Nov. 8, 2018

Related U.S. Application Data

(63) Continuation of application No. 15/174,098, filed on Jun. 6, 2016, now Pat. No. 10,023,963.

(51) Int. Cl.
| | |
|---|---|
| C23F 13/12 | (2006.01) |
| C23F 13/06 | (2006.01) |
| C23F 13/14 | (2006.01) |
| C09D 7/61 | (2018.01) |
| C08K 3/11 | (2018.01) |

(Continued)

(52) U.S. Cl.
CPC .............. *C23F 13/12* (2013.01); *C09D 5/084* (2013.01); *C09D 7/61* (2018.01); *C23F 13/005* (2013.01); *C23F 13/06* (2013.01); *C23F 13/14* (2013.01); *C08K 3/11* (2018.01); *C08K 2003/2262* (2013.01); *C08K 2003/2296* (2013.01); *C23F 2213/21* (2013.01)

(58) Field of Classification Search
CPC ........ C23F 13/12; C23F 13/005; C23F 13/06; C23F 13/14; C23F 2213/21; C09D 7/61; C09D 5/084; C08K 3/11; C08K 2003/2262; C08K 2003/2296
USPC ........................................................ 428/469
See application file for complete search history.

(56) References Cited

U.S. PATENT DOCUMENTS

| | | |
|---|---|---|
| 6,537,678 B1 | 3/2003 | Putnam et al. |
| 7,341,677 B2 | 3/2008 | Yu et al. |

(Continued)

FOREIGN PATENT DOCUMENTS

| | | |
|---|---|---|
| CN | 101481510 A | 7/2009 |
| EP | 1493846 A1 | 1/2005 |

(Continued)

*Primary Examiner* — William K Cheung
(74) *Attorney, Agent, or Firm* — Bachman & LaPointe, P.C.

(57) ABSTRACT

A corrosion resistant article including an aluminum substrate and a corrosion-inhibiting cerium based corrosion inhibitor corrosion inhibiting additive on the aluminum substrate, the corrosion inhibiting additive comprising an anodic corrosion inhibitor and a cathodic corrosion inhibitor, the anodic corrosion inhibitor greater than 25 wt % of the total inhibitor.

13 Claims, 2 Drawing Sheets

(51) Int. Cl.
  *C09D 5/08*  (2006.01)
  *C23F 13/00* (2006.01)
  *C08K 3/22*  (2006.01)

(56) References Cited

U.S. PATENT DOCUMENTS

| | | |
|---|---|---|
| 7,972,533 B2 | 7/2011 | Jaworowski et al. |
| 2007/0228332 A1* | 10/2007 | Jaworowski ............ C09D 5/002 252/387 |
| 2009/0004486 A1 | 1/2009 | Arsenault et al. |
| 2009/0117369 A1 | 5/2009 | Jaworowski et al. |
| 2014/0212354 A1 | 7/2014 | Arsenault-Preece et al. |

FOREIGN PATENT DOCUMENTS

| | | |
|---|---|---|
| EP | 1842881 A1 | 10/2007 |
| EP | 2011899 A2 | 1/2009 |
| WO | 2015001461 A1 | 1/2015 |

* cited by examiner

FIG. 1
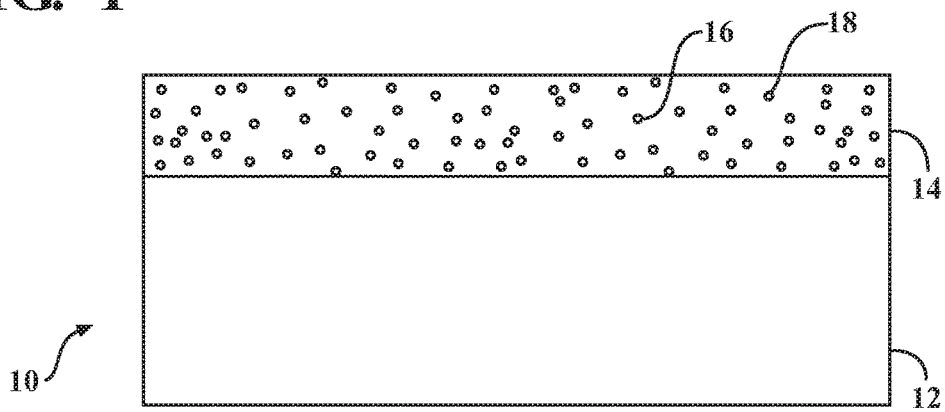
FIG. 2
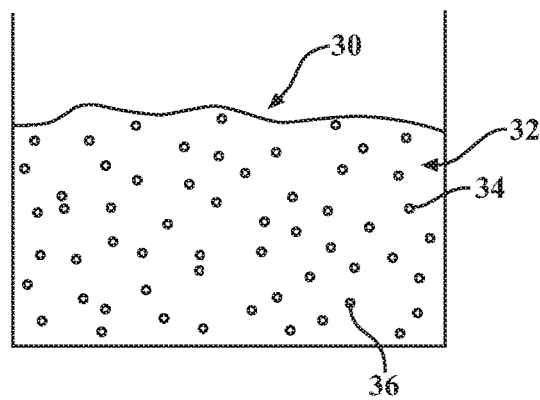
FIG. 3
Anodic corrosion inhibitor physical properties depend on source.
| Example Anodic Corrosion Inhibitors | Solubility in 3500ppm NaCl Solution at 22°C | pH of the solution |
|---|---|---|
| Zinc Molybdate (A) | < 5 mM | 5.7-6.0 |
| Zinc Molybdate (B) | > 10 mM | 5.3-5.6 |

FIG. 4

Active impurity (Na$^+$) levels of corrosion inhibitors from difference source

| Corrosion Inhibitors | [Na$^+$] |
|---|---|
| A | 0.5% |
| B | 0.8% |
| C | 0.7% |
| D | 0.9% |
| E | 0.8% |

FIG. 5

Performance of cathodic corrosion inhibitor, when blended with the same zinc molybdate, is source dependent

| Cathodic Corrosion Inhibitor source | Anodic Corrosion Inhibitor (Zinc Molybdate) | Corrosion Current density (µA/cm2) |
|---|---|---|
| Commercially available corrosion inhibitor system | | 0.02-0.03 |
| A1 | B | 1.0-1.3 |
| A2 | B | 0.01-0.02 |
| A3 | B | 0.02-0.08 |
| A4 | B | 0.04-0.3 |
| A5 | B | 0.01-0.2 |
| A6 | B | 0.1-0.3 |

FIG. 6

Corrosion inhibitor performance optimization

| Cathodic Corrosion Inhibitor (RE salt A) | Anodic Corrosion Inhibitor (Zinc Molybdate) | Corrosion Current density (µA/cm2) |
|---|---|---|
| Commercially available corrosion inhibitor system | | 0.02-0.03 |
| 50%(A2) | 12.5%(B) | 0.02-0.03 |
| 50%(A2) | 25%(B) | 0.02-0.03 |
| 50%(A2) | 37.5%(B) | 0.01-0.02 |
| 50%(A2) | 49.5+%(B) | 0.01-0.02 |

The percentages for each inhibitor shown on Figure 6, are per weight of the anodic and cathodic inhibitor

CORROSION INHIBITING ADDITIVE

CROSS-REFERENCE TO RELATED APPLICATIONS

This application is a Continuation of U.S. patent application Ser. No. 15/174,098, filed Jun. 6, 2016, now issued as U.S. Pat. No. 10,023,963.

BACKGROUND

The present disclosure relates to corrosion inhibitors and, more particularly, to a corrosion inhibitor that is effective for use on metal substrates.

Components made from metallic alloys, such as aluminum alloys, achieve higher strengths through inclusion of alloying elements. However, the presence of these alloying elements tends to make the alloy vulnerable to corrosion. Typically, the component utilizes a protective coating containing a corrosion-inhibitor to protect the underlying alloy from corrosion.

One type of corrosion-inhibitor includes hexavalent chromium in the form of a barium or strontium chromate compound, for example. Although effective, hexavalent chromium is considered a carcinogen and is therefore undesirable for use as a coating. Chrome-free corrosion-inhibitors have been used as an alternative to hexavalent chromium inhibitors. For example, chrome-free corrosion inhibitors utilize anodic and cathodic corrosion inhibitors to resist corrosion of the underlying alloy. One drawback of existing chrome-free corrosion inhibitors is that they may not provide equal corrosion protection for all alloy compositions. Although effective in providing corrosion protection, an even greater degree of corrosion protection is always desired.

SUMMARY

A corrosion resistant article according to one disclosed non-limiting embodiment of the present disclosure can include an aluminum alloy substrate; and a cerium based corrosion inhibitor corrosion inhibiting additive on the aluminum alloy substrate, the corrosion inhibiting additive comprising an anodic corrosion inhibitor and a cathodic corrosion inhibitor, the anodic corrosion inhibitor greater than about 25 wt % of the total corrosion inhibiting additive.

A further embodiment of the present disclosure may include, wherein the anodic corrosion inhibitor is at least 25% $ZnMoO_4$.

A further embodiment of the present disclosure may include, wherein the anodic corrosion inhibitor is at least 50% $ZnMoO_4$.

A further embodiment of the present disclosure may include, wherein the anodic corrosion inhibitor is at least 75% $ZnMoO_4$.

A further embodiment of the present disclosure may include, wherein the anodic corrosion inhibitor is at least 99% $ZnMoO_4$.

A further embodiment of the present disclosure may include, wherein the cathodic corrosion inhibitor includes a Ce-Citrate.

A method of selecting a corrosion-inhibiting substance, according to one disclosed non-limiting embodiment of the present disclosure can include selecting a corrosion-inhibiting cerium based corrosion inhibitor substance based upon a solubility range.

A further embodiment of the present disclosure may include, wherein the solubility range is 0.01 mM to 20 mM.

A further embodiment of the present disclosure may include, wherein the corrosion-inhibiting Cerium based corrosion inhibitor substance includes an anodic corrosion inhibitor containing at least 25% $ZnMoO_4$.

A further embodiment of the present disclosure may include, wherein the corrosion-inhibiting Cerium based corrosion inhibitor substance includes a cathodic corrosion inhibitor with a Ce-Citrate.

A further embodiment of the present disclosure may include, wherein the corrosion-inhibiting Cerium based corrosion inhibitor substance includes a cathodic corrosion inhibitor with a Ce-Tartrate, or a Ce-Acetate.

A further embodiment of the present disclosure may include, wherein the corrosion-inhibiting Cerium based corrosion inhibitor substance includes active sodium ions concentration lower than 1% in the corrosion inhibitor dry powder.

A further embodiment of the present disclosure may include, wherein the corrosion-inhibiting Cerium based corrosion inhibitor substance includes anodic and cathodic corrosion inhibitors synthesized separately as powders of a similar particle size range so that the powders can be mixed homogeneously.

A corrosion-inhibiting substance according to one disclosed non-limiting embodiment of the present disclosure can include a carrier fluid; a cathodic corrosion inhibitor within the carrier fluid; and an anodic corrosion inhibitor within the carrier fluid, the anodic corrosion inhibitor and a cathodic corrosion inhibitor, the anodic corrosion inhibitor greater than about 25 wt % of the total corrosion inhibitor.

A further embodiment of the present disclosure may include, wherein the carrier fluid comprises at least one of water, alcohol, primer, paint, adhesive, a coolant, or sealant.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 1 is a schematic view of an example component;

FIG. 2 is an example corrosion-inhibiting substance for forming a protective coating;

FIG. 3 is a chart illustrating that anodic corrosion inhibitors from different source have different fundamental physical properties such as solubility and solution pH;

FIG. 4 is a chart illustrating that corrosion inhibitors from different source have different levels of active impurity ions;

FIG. 5 is a chart illustrating that different cathodic corrosion inhibitor when compounding with the same anodic corrosion inhibitor has different performance. (Lower corrosion current indicates better performance); and FIG. 6 is a chart illustrating that different anodic corrosion inhibitor when compounding with the same cathodic corrosion inhibitor, the performance is improved at certain composition range (>25%).

DETAILED DESCRIPTION

With reference to FIG. 1, selected portions of an example corrosion resistant article 10, such as an aerospace component, or other type of article is schematically illustrated. In this example, the corrosion resistant article includes a substrate 12 and a corrosion inhibiting additive 14 on the substrate 12. The corrosion inhibiting additive 14 resists corrosion of the underlying substrate 12. Although a particular structure of the corrosion inhibiting additive 14 and substrate 12 is shown in the disclosed examples, it is to be appreciated that the disclosed configuration is not limited to the example shown and may include additional layers or coatings.

In the illustrated example, the corrosion inhibiting additive 14 includes an anodic corrosion inhibitor 16 and a cathodic corrosion inhibitor 18 that protects the underlying substrate 12 against corrosion. For example, the anodic corrosion inhibitor suppresses metal oxidation reactions, and the cathodic corrosion inhibitor 18 suppresses reduction reactions.

The non-carcinogenic corrosion-inhibiting additive comprises, in combination, an anodic corrosion inhibitor and a cathodic corrosion inhibitor. By anodic corrosion inhibitor is meant suppression of metal oxidation reactions. By cathodic corrosion inhibitor is meant suppression of reduction reactions. In order to be effective, both the anodic and cathodic corrosion inhibitors should be "strong" corrosion inhibitors. By strong anodic corrosion inhibitor is meant a compound that is soluble in alkaline media, while precipitating as a reduced, insoluble oxide under neutral and acidic reducing conditions that, exists as an insoluble oxide below −600 mv vs Ag/AgCl at pH 7, and below −300 mv vs Ag/AgCl at pH 2. By a strong cathodic corrosion inhibitor is meant a compound that is soluble in acidic media, while undergoing a valance change to precipite as an insoluble oxide under neutral and alkaline and moderately oxidizing conditions, that is, existing as an insoluble oxide above −300 mv vs Ag/AgCl at pH 7, and above −900 mv vs Ag/AgCl at pH 12.

The corrosion inhibiting additive requires both an anodic corrosion inhibitor and a cathodic corrosion inhibitor in order to be effective against general corrosion and pitting corrosion. General corrosion means uniform dissolution of base metal. By pitting corrosion is meant localized corrosion of metal resulting in the formation of corrosion pits. The anodic corrosion inhibitor is effective against general corrosion while the cathodic corrosion inhibitor is particularly effective against pitting corrosion.

Suitable cathodic corrosion inhibitors for use in the inhibiting additive of the present invention include rare earth metal compounds, particularly metal salts of the elements of Group IIIB of the Periodic Table (the CAS version). All of the foregoing elements have cathodic corrosion inhibiting characteristics; however, it has been found that cerium, neodymium and praseodymium are "strong" cathodic corrosion inhibitors as defined above and are therefore preferred Group IIIB elements. Particularly preferred cathodic corrosion inhibitors are compounds of cerium and, most preferred are cerous compounds. The 3+ valence state Cerium (III) Citrate is one preferred cathodic inhibitor. Suitable anodic corrosion inhibitors for use in the inhibiting additive of the present invention include transition element metal salts, preferably of elements from Groups VB and VIB and VIIB of the Periodic Table, with the exception of hexavalent chromium, and more particularly include compounds of vanadium, molybdenum, manganese, and tungsten and more particularly molybdate compounds.

A metal complexing agent is used in combination with the above described anodic and cathodic corrosion inhibitors. The metal complexing agent is preferably a water soluble organic acid salt and/or a water soluble inorganic acid salt. Particularly useful metal complexing agents are selected from the group consisting of citrate, gluconate, polyphosphate, tartrate, acetate, oxalate, β-diketonates, α-hydroxy acids, D-fructose, L-sorbose and mixtures. The metal complexing agent should be present in an amount of between 0.1 to 1.0, preferably between 0.3 to 0.7 with respect to the mole fraction of the combined anodic and cathodic corrosion inhibitor.

Preferred additives that are non-carcinogenic, effect against corrosion and exhibit sufficiently effective solubility include, for example, cerium citrate; cerium acetate; cerium tartrate; cerous citrate; zinc molybdate; zinc oxide; cerium citrate with zinc molybdate; cerium citrate with zinc molybdate and zinc oxide; cerous citrate with zinc molybdate; cerous citrate with zinc molybdate and zinc oxide; cerium citrate with molybdenum oxide and strontium tungstate, and mixtures thereof.

The corrosion inhibiting additive may be added as an inhibitive pigment in adhesives, paints and primers, organic sealants, epoxies, cooling fluids, lubricants, and the like (hereafter referred to as a carrier fluid). These products may be applied to the substrate that is being protected by any suitable manner such as spraying, brushing, dipping, or the like. In addition, the corrosion inhibiting additive, whose solubility is increased by the metal complexing agent, is dissolved in a carrier such as alcohol, water or the like and formed on the surface of a substrate as a conversion coating. In either case, that is, as an additive to adhesive, paints and primers, epoxies and the like, or as an additive to a solution for conversion coating or cooling fluids or lubricants, the corrosion inhibiting additive is provided in a solution comprising a carrier and the corrosion inhibiting additive. In the first case described above with regard to paints and primers, etc., the carrier may be at least an organic binder.

When the corrosion inhibiting additive is to be applied by conversion coating or cooling fluid or lubricant, the carrier may simply be, for example, water, or alcohol, or an organic fluid. Solutions for conversion coatings and compounds used as adhesives, paints and primers, and epoxies and their preparation are well-known in the art as evidenced by the above-referenced patents referred to in the background of the invention which are incorporated herein by reference.

When the corrosion inhibiting additive is used as an additive to solutions such as adhesives, paints and primers, sealants, epoxies and the like (herein referred to as carriers), it is preferred that the minimum amount of anodic corrosion inhibitor plus cathodic corrosion inhibitor is at least 1% PVC (pigment volume concentration) and the metal complexing agent is present in at least 0.1 mole fraction of combined inhibitor. It is preferred that molar solubility in water of the anodic corrosion inhibitor and the cathodic corrosion inhibitor lie between 0.01 mM and 20 mM. The term "about" as used in this description relative to numerical values such as compositions refers to possible variation in the value, such as normally accepted variations or tolerances in the art.

When the corrosion inhibiting additive is dissolved in solution with a carrier, such as alcohol, or water, or an organic fluid, and applied to a substrate as a conversion coating, it is preferred that the additive be present in an amount of between about 1 to 1,000 mg/ft$^2$ and wherein the minimum amount of combined anodic corrosion inhibitor and cathodic corrosion inhibitor is at least 0.5 mg/ft$^2$ and the metal complexing agent is present in an amount of at least 0.1 mole fraction of combined inhibitors. The concentration of the anodic corrosion inhibitor and cathodic corrosion inhibitor in the carrier should be between 0.001 and 100 grams/liter, preferably between 0.002 and 10 grams/liter and the metal complexing agent between 0.0005 to 50 grams/liter, preferably 0.001 to 5 grams/liter. When the corrosion inhibiting additive is dissolved with a carrier for use in water circulation systems such as boiler feed systems, radiator fluid systems, and the like, the concentration of the anodic corrosion inhibitor and the cathodic corrosion inhibitor in the carrier should be between 1 ppm and 100,000 ppm, preferably between 2 ppm and 10,000 ppm while the metal complexing agent is present in an amount of 0.5 to 50,000 ppm, preferably 1 to 5,000 ppm.

The corrosion inhibiting additive is particularly useful in preventing general corrosion and pitting corrosion on metal substrates, particularly, high strength aluminum alloys for use in the aerospace industry. The additive may be applied in any manner known in the art including as a conversion coating, or applied as a primer, adhesive, epoxy, paint, organic sealant, sealer for anodized aluminum, additive for recirculating water system or the like. Obviously the use of the corrosion inhibiting additive of the present invention extends to other fields outside of aerospace and includes automotive, architectural, packaging, electronics, HVAC and marine.

In one example, the anodic corrosion inhibitor includes at least one of a vanadate compound, a permanganate compound, a tungstate compound, or a molybdate compound. In a further example, the anodic corrosion inhibitor is zinc molybdate and zinc oxide. In a yet further example, the anodic corrosion inhibitor is zinc molybdate. The cathodic corrosion inhibitor includes at least one element selected from the Group IIIB Periodic Table elements. In a further example, the cathodic corrosion inhibitor includes cerium. For example, the cerium is in the form of cerium citrate or cerous citrate. In yet a further example, the anodic corrosion inhibitor 16 includes only zinc molybdate, and the cathodic corrosion inhibitor includes only the cerium citrate or cerous citrate, which may ensure that other elements of unknown reactivity are not present within the corrosion inhibiting additive 14.

The corrosion inhibiting additive 14 may be used in any of a variety of different forms. For example, the anodic corrosion inhibitor 16 and the cathodic corrosion inhibitor 18 may be used as an additive or pigment in adhesives, paints, primers, sealants, cooling fluid, or the like. In another example, the anodic corrosion inhibitor 16 and the cathodic corrosion inhibitor 18 are used as an additive in a conversion coating process for forming the corrosion inhibiting additive 14. In one example, the anodic corrosion inhibitor 16 and the cathodic corrosion inhibitor 18 comprise about 1 to 50% PVC (pigment volume concentration) of the corrosion inhibiting additive 14 with the remaining amount a matrix surrounding the corrosion inhibitors 16 and 18.

With reference to FIG. 2, the corrosion inhibiting additive 14 may be formed from a corrosion inhibiting substance 30 that is added to a primer, paint, adhesive, sealant, conversion coating, cooling fluid, or used as a directly applied corrosion inhibitor. The corrosion inhibiting substance 30 includes a carrier fluid 32, a cathodic corrosion inhibitor 34 within the carrier fluid 32, and an anodic corrosion inhibitor 36 within the carrier fluid. Depending upon the composition of the carrier fluid 32, the corrosion inhibitors 34 and 36 may exist as solid particles within the carrier fluid 32 or as dissolved substances within the carrier fluid 32.

In one example, the anodic corrosion inhibitor 36 is a corrosion inhibitor that is suitable for avoiding reaction with zinc when exposed to an aluminum alloy containing zinc. For example, the zinc-inert anodic corrosion inhibitor 36 includes a vanadate, or permanganate, or molybdate compound. In a further example, the compound is zinc molybdate. In yet a further example, the compound is zinc molybdate and zinc oxide. The cathodic corrosion inhibitor 34 includes at least one element selected from the Group IIIB Periodic Table elements. In a further example, the cathodic corrosion inhibitor 34 includes cerium. For example, the cerium is in the form of cerium citrate. In a further example, the cerium is in the form of cerous citrate.

The amounts of the cathodic corrosion inhibitor 34 and the zinc-inert anodic corrosion inhibitor 36 within the carrier fluid 32 depend upon the desired composition of the corrosion inhibiting additive 14. In one example, the concentration of each of the corrosion inhibitors 34 and 36 within the carrier fluid is about 0.001 to 100 grams per liter of the carrier fluid 32.

The cathodic and anodic corrosion inhibiting ions' concentrations facilitate effective corrosion protection. For the cathodic corrosion protection, rare earth corrosion inhibitors based on Cerium, Yttrium, Lanthanum, or Praseodymium shall be effective if the ions concentration is within an effective range.

As an exhibition, for cerium based corrosion inhibitor to be most effective when loaded in a bond primer or paint primer, the corrosion inhibitor has a solubility range of 0.01 mM to 20 mM so that effective amount of cerous ions ($Ce^{3+}$) can be released from the carrier for active corrosion protection when applied on aluminum alloys. The solubility relates to source selection, synthesis process control, and pH adjustment etc. When the corrosion inhibitor is loaded in the bond primer or paint primer, effective cerrous ions will leach out for active corrosion protection with a long lifetime.

Cerous ion is effective for corrosion inhibition, yet, high concentration thereof may decrease its cathodic corrosion protection function as such concentrations may result in consumption of the corrosion inhibitor that results in a relatively short lifetime. Cerous based components thus shall not have a solubility higher than the effective range. Examples of cerous based compounds can be formed from organic salts such as, for example, citrates, acetates, malonates, tartrates etc.

For the anodic corrosion protection, corrosion inhibitors such as molybdates, vanadates, tungstates, and permanganates are effective. The solubility of the anodic corrosion inhibitors are limited so that the primers provide a relatively long lifetime without too high a corrosion inhibitor loading. The concentration of anodic corrosion inhibiting ions is higher than that of cathodic corrosion inhibitors for the effective corrosion inhibiting performance. As an example, corrosion protection properties may max out when $MoO_4^{2-}$ ion concentration reaches a certain level, i.e., the relatively higher concentration of $MoO_4^{2-}$ ion does not decrease the corrosion protection property.

The effective amounts of corrosion inhibiting ions reach the substrate surface to passivate the surface from anodic and cathodic reaction. In commercially available corrosion inhibitor system, the anodic corrosion protection is realized through the effective leach of the active ions ($MoO_4^{2-}$) from the primer, whereas the cathodic corrosion protection is realized through the effective leach of the active ions ($Ce^{3+}$) from the primer. From mechanistic studies, molybdates elevate the pitting potential and thus operate on the anodic reaction. Anodic inhibitors suppress the anode (metal oxidation) reaction. Cathodic inhibitors suppress reduction reactions that couple with the anodic oxidation reaction.

The anodic and cathodic corrosion inhibitors are synthesized separately as powders with a relatively narrow particle size distribution. That is, the particles of the anodic and cathodic corrosion inhibitors may have a similar particle size range so that the powders can be mixed homogeneously within the carrier 32.

The composition of the corrosion inhibitor also affects the performance. The composition may be optimized based on the solubility of each corrosion-inhibiting component, and the solubility of any potential cross-reaction product between the corrosion inhibitor components. The composition relates to the reaction kinetics of anodic corrosion and cathodic corrosion. The composition optimization can be based on sample testing.

In one embodiment, the $MoO_4^{2-}$ deposited includes a Zinc molybdate ($ZnMoO_4$). The corrosion inhibitor is essentially free of active impurity ion contamination, which may be brought in from metathesis reaction to synthesize the corrosion inhibitor compounds. The impurity ions may be chlorides, nitrates, ammonium ions, sodium ions that may adsorb on the corrosion inhibitor particle surface. The active $Na^+$ ions concentration, in one embodiment, is lower than 1% in the corrosion inhibitor dry powder.

With reference to FIG. 3, the anodic corrosion inhibitors from different sources have different fundamental physical properties such as solubility and solution pH. The corrosion inhibitors from different source have different levels of active impurity ions (FIG. 4). In other words, anodic corrosion inhibitors from different suppliers, or different synthesis routes, have different performances when blended with the same amount of the same cathodic corrosion inhibitor. Particular zinc molybdate result in different performance characteristics as evidenced by the different solution pH.

With reference to FIG. 5, different cathodic corrosion inhibitors when compounding with the same anodic corrosion inhibitor, have different performances in which a lower corrosion current indicates better performance. In other words, cerium citrates from different suppliers, or different synthesis routes, have different performance when blended with the same sourced zinc molybdate. With reference to FIG. 6, the different anodic corrosion inhibitors, when compounding with the same cathodic corrosion inhibitor, increase performance at certain composition range (when greater than about 25% per weight of the combined anodic and cathodic inhibitor). For example, 49.5+% and 37.5% per weight $ZnMoO_4$ in a blend have improved performance over 25% or 12.5% per weight $ZnMoO_4$ when blended with the same amount of cerous citrate (50% per weight of the total inhibitor formulation). In the above examples the percentage balance in each inhibitor formulation is zinc oxide (ZnO). Furthermore, 99+% per weight purity $ZnMoO_4$ is most effective and is sufficiently soluble.

As can be seen from the Figures, the additive of the present invention is effective against corrosion and superior to commercially available corrosion inhibitors. Practical synthesis, manufacturing, and compounding optimization thereby improve corrosion inhibiting performance. The loading of the corrosion inhibitor powder in carriers thus may be reduced for sufficient corrosion protection. Lower loading of the corrosion inhibiting pigment reduces cost, and reduces the impact to primer layer mechanical properties.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An article comprising:
    a metal substrate; and
    a cerium based corrosion inhibiting additive on the metal substrate, the corrosion inhibiting additive comprising an anodic corrosion inhibitor and a cathodic corrosion inhibitor, the anodic corrosion inhibitor greater than about 25 wt % of the total inhibitor, wherein the anodic corrosion inhibitor is at least 25 wt % $ZnMoO_4$.

2. The corrosion resistant article as recited in claim 1, wherein the anodic corrosion inhibitor is at least 50 wt% $ZnMoO_4$.

3. The corrosion resistant article as recited in claim 1, wherein the anodic corrosion inhibitor is at least 75 wt % $ZnMoO_4$.

4. The corrosion resistant article as recited in claim 1, wherein the anodic corrosion inhibitor is at least 99 wt % $ZnMoO_4$.

5. The corrosion resistant article as recited in claim 1, wherein the cathodic corrosion inhibitor includes a Ce-Citrate.

6. A method of selecting a corrosion-inhibiting substance, comprising:
    selecting a cerium-based corrosion-inhibiting composition based upon a solubility range, the corrosion inhibiting additive comprising an anodic corrosion inhibitor and a cathodic corrosion inhibitor, the anodic corrosion inhibitor greater than about 25 wt % of the total inhibitor, wherein the corrosion-inhibiting cerium based corrosion inhibitor substance includes an anodic corrosion inhibitor containing at least 25 wt % $ZnMoO_4$.

7. The method as recited in claim 6, wherein the solubility range is 0.01 mM to 20 mM.

8. The method as recited in claim 6, wherein the corrosion-inhibiting Cerium based corrosion inhibitor substance includes a cathodic corrosion inhibitor with a Ce-Citrate.

9. A method of selecting a corrosion-inhibiting substance, comprising:
   selecting a cerium-based corrosion-inhibiting composition based upon a solubility range, the corrosion inhibiting additive comprising an anodic corrosion inhibitor and a cathodic corrosion inhibitor, the anodic corrosion inhibitor greater than about 25 wt % of the total inhibitor, wherein the corrosion-inhibiting cerium based corrosion inhibitor substance includes a cathodic corrosion inhibitor with a Ce-Tartrate, or a Ce-Acetate.

10. The method as recited in claim 6, wherein the corrosion-inhibiting Cerium based corrosion inhibitor substance includes active sodium ions concentration lower than 1% in the corrosion inhibitor dry powder.

11. The method as recited in claim 6, wherein the corrosion-inhibiting Cerium based corrosion inhibitor substance includes anodic and cathodic corrosion inhibitors synthesized separately as powders of a similar particle size range so that the powders can be mixed homogeneously.

12. A corrosion-inhibiting composition comprising:
   a carrier fluid;
   a cathodic corrosion inhibitor in the carrier fluid; and
   an anodic corrosion inhibitor in the carrier fluid, the anodic corrosion inhibitor greater than about 25 wt % of the total inhibitor.

13. The composition as recited in claim 12, wherein the carrier fluid comprises at least one of water, alcohol, organic or inorganic solvent or dispersing fluid, primer, paint, adhesive, a coolant, or sealant.

* * * * *